US006965719B2

(12) United States Patent
Aikawa et al.

(10) Patent No.: US 6,965,719 B2
(45) Date of Patent: Nov. 15, 2005

(54) DISPERSION COMPENSATING OPTICAL FIBER AND DISPERSION COMPENSATING OPTICAL FIBER MODULE

(75) Inventors: Kazuhiko Aikawa, Sakura (JP); Yutaka Nagasawa, Ichikawa (JP); Shogo Shimizu, Chiba (JP); Takaaki Suzuki, Sakura (JP); Masakazu Nakayama, Yachimata (JP); Kuniharu Himeno, Sakura (JP); Ryozo Yamauchi, Sakura (JP); Keiji Ohashi, Sakura (JP); Munehisa Fujimaki, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/104,916

(22) Filed: Mar. 21, 2002

(65) Prior Publication Data

US 2003/0049006 A1 Mar. 13, 2003

(30) Foreign Application Priority Data

Jun. 26, 2001 (JP) ................................. P2001-193546

(51) Int. Cl.⁷ .............................................. G02B 6/16
(52) U.S. Cl. ...................................... 385/128; 385/141
(58) Field of Search ............................... 385/123–128, 385/141–145

(56) References Cited

U.S. PATENT DOCUMENTS

| 3,980,390 A | * | 9/1976 | Yamamoto et al. ......... 385/128 |
| 4,482,204 A | * | 11/1984 | Blyler et al. ................. 385/141 |
| 4,715,679 A | * | 12/1987 | Bhagavatula ................ 385/127 |
| 4,801,186 A | | 1/1989 | Wagatsuma et al. |
| 4,877,304 A | * | 10/1989 | Bhagavatula ................ 385/124 |
| 5,259,060 A | * | 11/1993 | Edward et al. ............... 385/128 |

(Continued)

FOREIGN PATENT DOCUMENTS

| EP | 1 083 446 A2 | 3/2001 |
| EP | 1 107 027 A1 | 6/2001 |
| JP | 56149351 | 11/1981 |
| JP | 0294229 | 7/1990 |
| JP | 04006125 | 1/1992 |
| JP | 04310547 | 11/1992 |
| JP | 04342445 | 11/1992 |
| JP | 05203847 | 8/1993 |
| JP | 08036123 | 2/1996 |
| JP | 10-62301 | 3/1998 |
| JP | 10115727 | 5/1998 |
| JP | WO 00/50935 | 8/2000 |
| WO | WO 01/11402 A1 | 2/2001 |

OTHER PUBLICATIONS

Kashiwada, T., et al., "Broadband Dispersion Compensating Module Considering its Attenuation Spectrum Behavior for WDM System," OFC IOOC '99 Technical Digest, Optical Fiber Communication Conference and the International Conference on Integrated Optics and Optical Fiber Communication, San Diego Convention Center, San Diego, California, Feb. 21–26, 1999, pp. 229–231.

(Continued)

Primary Examiner—Joseph Williams
Assistant Examiner—Dalei Dong
(74) Attorney, Agent, or Firm—Bell, Boyd & Lloyd LLC

(57) ABSTRACT

A dispersion compensating optical fiber includes an uncovered dispersion compensating optical fiber containing a core and a cladding, and a resin coating which is disposed around the uncovered dispersion compensating optical fiber, wherein the resin coating has an adhesive property of 10 g/mm or less, and which includes an outer coating layer which is formed to have a thickness of 3 μm or more, and the outer diameter of the uncovered dispersion compensating optical fiber is in a range from 90 to 125 μm, and the outer diameter of the dispersion compensating optical fiber is in a range from 180 to 250 μm.

1 Claim, 5 Drawing Sheets

U.S. PATENT DOCUMENTS

| | | | |
|---|---|---|---|
| 5,261,016 A | | 11/1993 | Poole |
| 5,361,319 A | | 11/1994 | Antos et al. |
| 5,381,504 A | * | 1/1995 | Novack et al. ............. 385/128 |
| 5,416,880 A | * | 5/1995 | Edwards et al. ............ 385/128 |
| 5,448,674 A | | 9/1995 | Vengsarkar et al. |
| 5,555,340 A | | 9/1996 | Onishi et al. |
| 5,568,583 A | | 10/1996 | Akasaka et al. |
| 5,644,670 A | * | 7/1997 | Fukuda et al. .............. 385/124 |
| 5,673,354 A | | 9/1997 | Akasaka et al. |
| 5,680,491 A | | 10/1997 | Shigematsu et al. |
| 5,684,909 A | * | 11/1997 | Liu ............................ 385/127 |
| 5,701,188 A | | 12/1997 | Shigematsu et al. |
| 5,740,297 A | | 4/1998 | Onishi et al. |
| 5,742,723 A | | 4/1998 | Onishi et al. |
| 5,781,673 A | | 7/1998 | Reed et al. |
| 5,799,123 A | | 8/1998 | Oyobe et al. |
| 5,802,234 A | | 9/1998 | Vengsarkar et al. |
| 5,802,235 A | | 9/1998 | Akasaka |
| 5,838,867 A | | 11/1998 | Onishi et al. |
| 5,887,093 A | | 3/1999 | Hansen et al. |
| 5,887,104 A | * | 3/1999 | Sugizaki et al. ............ 385/123 |
| 5,933,561 A | | 8/1999 | Sugizaki |
| 5,995,694 A | | 11/1999 | Akasaka et al. |
| 5,999,679 A | * | 12/1999 | Antos et al. ................ 385/127 |
| 6,009,221 A | | 12/1999 | Tsuda |
| 6,021,245 A | | 2/2000 | Berger et al. |
| 6,031,955 A | | 2/2000 | Mukasa et al. |
| 6,048,911 A | * | 4/2000 | Shustack et al. .............. 522/96 |
| 6,055,081 A | | 4/2000 | Koyano et al. |
| 6,173,102 B1 | * | 1/2001 | Suzuki et al. ............... 385/128 |
| 6,744,959 B2 | * | 6/2004 | Takahashi ................... 385/123 |

OTHER PUBLICATIONS

Grüner–Nielsen, L., et al. "Design and manufacture of dispersion compensating fibre for simultaneous compensation of dispersion and dispersion slope," OFC IOOC '99 Technical Digest, Optical Fiber Communication Conference and the International Conference on Integrated Optics and Optical Fiber Communication, San Diego Convention Center, San Diego, California, Feb. 21–26, 1999, pp. 232–234.

Berkey, G.E., et al., "Negative Slope Dispersion Compensating Fibers," OFC IOOC '99 Technical Digest, Optical Fiber Communication Conference and the International Conference on Integrated Optics and Optical Fiber Communication, San Diego Convention Center, San Diego, California, Feb. 21–26, 1999, pp. 235–237.

Tsuritani, T., et al., "1Tbit/s (100×10.7Gbit/s) Transoceanic Transmission Using 30nm–Wide Broadband Optical Repeaters with Aeff–Enlarged Positive Dispersion Fibre and Slope–Compensating DCF," ECOC '99 Conference & Exhibition, $25^{th}$ European Conference on Optical Communication, Sep. 26–30, 1999, Nice, France, pp. 38–39.

Yanada, E. et al., "Dual–band Hybrid Transmission Line Consisting of Pure Silica Core Fiber and Dispersion Compensating Fiber," OFC 2000 Technical Digest, Optical Fiber Communication Conference, Baltimore, Convention Center, Baltimore Maryland, Mar. 7–10, 2000, pp. 92–94.

Yanada, E., et al., "Perfectly dispersion slope compensated hybrid optical transmission line," Proceedings of the 2000 IEICE General Conference, The Institute of Electronics, Information and Communication Engineers, Hiroshima University, Higashi–Hiroshima, Mar. 28–31, 2000, pp. 217.

Suzuki, T., et al., "Large–effective–area dispersion compensating fibers for dispersion accommodation both in the C and L band," OECC 2000 Technical Digest, Fifth Optoelectronics and Communications Conference, Nippon Convention Center, Makuhari Messe, Chiba, Japan, Jul. 10–14, 2000, pp. 554–555.

Fujii, T., et al., "High Performance Dispersion Compensating Fiber Modules by Module 'Stress–Free Coil' Packaging Techique," NFOEC National Fiber Optic Engineers Conference Technical Proceedings, $16^{th}$ Annual Fiber Optic Engineers Conference, Colorado Convention Center, Denver, Colorado, Aug. 27–31, 2000, pp. 420–429.

Shimizu, S., et al., "Dispersion Compensating Fiber Module for L–band With Low Nonlinearity," Proceedings of the 2001 IEICE General Conference, The Institute of Electronics, Information and Communication Engineers, Ritsumeikan University, Kusatsu, Mar. 26–29, 2001, pp. 198.

Tarasiuk, B., et al., "Urethane–Acrylates as main components of lacquers for protective coating of some materials," Mol. Cryst. and Liq. Cryst., vol. 354, Jun. 2000, pp. 49–53.

* cited by examiner

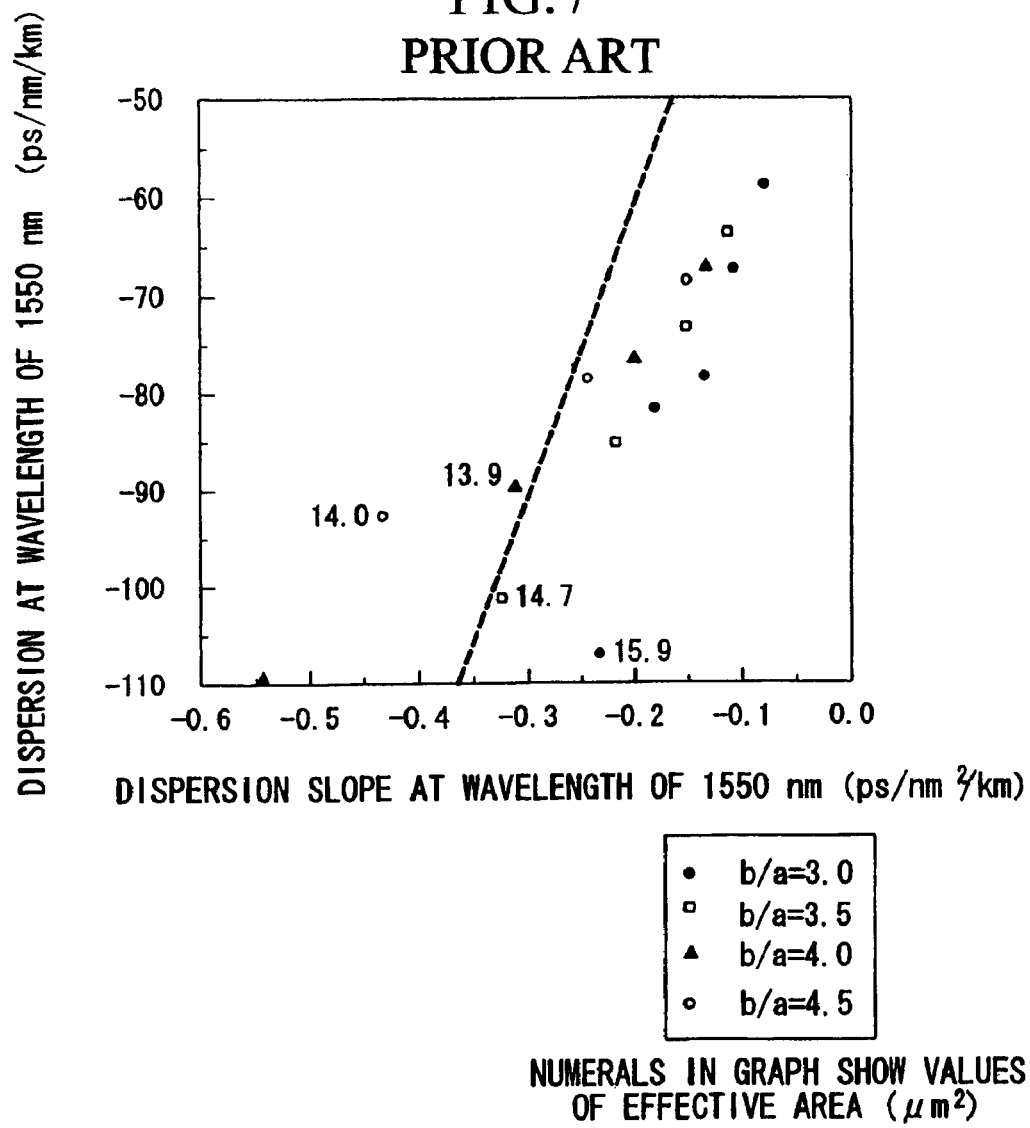

US 6,965,719 B2

DISPERSION COMPENSATING OPTICAL FIBER AND DISPERSION COMPENSATING OPTICAL FIBER MODULE

BACKGROUND OF THE INVENTION

1. Field of the Invention

The present invention relates to a dispersion compensating optical fiber and to a dispersion compensating optical fiber module. Specifically, the present invention relates to a dispersion compensating optical fiber compensating for wavelength dispersion and the dispersion slope caused by transmitting optical signals in an employed wavelength band selected from the wavelength region from 1.52 μm to 1.63 μm by means of a standard single mode optical fiber with a dispersion zero at 1.3 μm, and relates to a dispersion compensating optical fiber module including the dispersion compensating optical fiber.

2. Description of Related Art

Systems including optical amplifiers such as very-long-distance non-repeating relays for wavelengths of 1.52 to 1.63 μm are already commercially available as erbium-doped optical fiber amplifiers and are in practical use. Furthermore, the development of wavelength division multiplexing transmission has rapidly progressed with the increase in transmission capacity. Wavelength division multiplexing transmission system is already commercially available in a number of transmission lines. It is anticipated that the expansion of the wavelength band and the increase in the number of times wavelengths are multiplexed will rapidly progress in the future.

In order to perform high-speed transmission, the wavelength dispersion in transmission lines of optical fibers are preferably as small as possible in the transmission band, but are not zero. Moreover, in order to perform wavelength division multiplexing in a transmission system, it is important that the ratio of dispersion change relative to wavelength change in the entire length of the transmission path (which is referred to as "dispersion slope", hereinafter) is small in order to decrease the difference in the dispersion between each wavelength in an employed wavelength band, in addition to decreasing amplification differences caused by the erbium-doped optical fiber amplifier in the employed wavelength band and decreasing the wavelength dispersion.

Moreover, recent long-distance systems require techniques for suppressing effects of nonlinearity which may cause deterioration, such as transmission characteristics, because the number of wavelengths multiplexed and the optical power propagating through the optical fiber rapidly increase.

The magnitude of the nonlinearity is expressed as $n_2/A_{eff}$, where $n_2$ represents the nonlinear refractive index for the optical fiber, and $A_{eff}$ represents the effective area of the optical fiber. In order to suppress the effects of the nonlinearity, $n_2$ is required to be small or $A_{eff}$ is required to be large. However, it is difficult to significantly decrease $n_2$ in an optical fiber composed of silica glass material, because $n_2$ is a constant value of a material for the optical fiber. Therefore, it is important to increase $A_{eff}$ in order to suppress the effect of nonlinearity.

Recently, single mode optical fiber networks for a wavelength of 1.3 μm are being used worldwide. When the transmission for a wavelength of 1.55 μm band is performed by using the optical fiber network, about +17 ps/nm/km of wavelength dispersion is caused. Therefore, when optical signals are transmitted through the optical fiber, the transmission characteristics are worsened by the wavelength dispersion.

A dispersion compensating optical fiber for compensating the wavelength dispersion has been developed and is commercially available. The dispersion compensating optical fiber has a large negative dispersion in the 1.55 μm wavelength band. By connecting the dispersion compensating optical fiber to a transmitting single mode optical fiber at a suitable length, accumulated positive dispersion caused by the transmitting single mode optical fiber can be compensated for, which actualizes high-speed communication.

Moreover, the wavelength division multiplexing system has recently progressed accompanying the increase in the transmission capacity. For example, in the case of compensating for the wavelength dispersion of the transmitting optical fiber for the wavelength of 1.3 μm by using a dispersion compensating optical fiber having a large negative wavelength dispersion and a positive dispersion slope, although the dispersion of one wavelength among wavelengths can be compensated for, the dispersions of other wavelengths are not sufficiently compensated for, and the transmission characteristics of the wavelengths far from the compensated wavelength are worsened.

Accordingly, a dispersion-slope-compensating and dispersion-compensating optical fiber having a W-type refractive index profile with a negative dispersion slope as shown in FIG. 6 (which is referred to as a "dispersion compensating optical fiber with a W-type profile") was developed. In FIG. 6, a center core portion 1, a side core portion 2, and a cladding portion 4 are shown. In the dispersion compensating optical fiber with the W-type profile, the dispersion slope can also be entirely compensated for by controlling the specific refractive index difference Δ1 of the center core portion 1 relative to the cladding portion 4, the specific refractive index difference Δ2 of the side core portion 2 relative to the cladding portion 4, and the ratio of the radius 1 of the center core portion 1 relative to the radius b of the side core portion 2.

The dispersion-slope-compensating and dispersion-compensating optical fiber can compensate for the wavelength dispersion and the dispersion slope by rendering it into a cable for a transmission line or by inserting it as a small module into the receiving side or the transmitting side of an existing transmission line.

However, a conventional dispersion compensating optical fiber has a structure in which the specific refractive index difference Δ1 of the center core portion increases and the specific refractive index difference Δ2 of the side core portion around the core portion decreases, and has a small core diameter, in order to increase the absolute value of the wavelength dispersion per unit length while having a refractive index distribution profile as shown in FIG. 6. FIG. 7 shows the relationship between the dispersion slope and the wavelength dispersion when the value of b/a is changed with setting Δ1 to 1.8% and Δ2 to −0.4%.

In FIG. 7, a dotted line shows 100% of the dispersion slope compensation ratio, which is the desirable value of the dispersion slope compensation ratio. The dispersion slope compensation ratio is calculated by dividing the ratio of the dispersion slope of a dispersion compensating optical fiber relative to the dispersion slope of a transmitting single mode optical fiber by the ratio of the dispersion value of the dispersion compensating optical fiber relative to the dispersion value of the transmitting single mode optical fiber. Moreover, values of effective areas ($A_{eff}$) are also shown in FIG. 7. As shown in FIG. 7, although dispersion compensating optical fibers with the W-type profile can have desirable dispersion characteristics, the bending loss tends to increase and the effective areas tend to be small, which tends to cause nonlinear effects.

Although examples in which the dispersion slopes are compensated for by means of the dispersion compensating optical fibers each having a W-type profile are reported in TuG3 of OFC 2000 (Optical Fiber Communication Conference) and in C3-3-38 of the Institute of Electronics, Information and Communication Engineers in 2000, for example, effective areas ($A_{eff}$) of both of the dispersion compensating optical fibers are 18.4 $\mu m^2$, which are not sufficiently large.

Moreover, in order to improve the bending loss and the dispersion slope characteristics, a dispersion-slope-compensating and dispersion-compensating optical fiber having segment-attached a W-type refractive index profile as shown in FIG. 1 has been developed. In FIG. 1, a center core portion 1, a core portion 2 disposed around the center core portion 1, a ring core portion disposed around the core portion 2, and a cladding portion 4 disposed around the ring core portion 3 are shown.

Although the present inventors reported, at 14C4-4 at the OECC 2000 (Optoelectronics and Communications Conference), one embodiment of this dispersion compensating optical fiber compensating the dispersion slope, which has an effective area ($A_{eff}$) enlarged to 21.0 $\mu m^2$, the absolute value of the wavelength dispersion is 61.5 ps/nm/km, which is small. Therefore, it is required to increase the length of the fiber for producing a dispersion compensating optical fiber module by winding the fiber into a small coil. However, it is difficult to wind the fiber into the small coil and to miniaturize the module. When the length of the fiber used becomes longer, the cost required for producing the module increases.

The present inventors, Shimizu et al., reported, at C3-3-33 of the Institute of Electronics, Information and Communication Engineers in 2001, a dispersion compensating optical fiber module having low nonlinear properties, low losses, and superior dispersion slope compensating functions, which are not provided conventionally.

However, the dispersion compensating optical fiber has characteristics in which the microbending loss increases as the dispersion slope compensation ratio increases from low values to 100%. Moreover, the microbending loss tends to be caused by decreasing the dispersion values or increasing the effective area. In order to prevent the microbending loss, a method in which an optical fiber is fixed by a resin without using a reel (NFOEC (National Fiber Optic Engineers Conference) 2000, pp. 420 to 429).

An optical fiber generally includes a coating layer which is made from at least one ultraviolet light curable resin such as ultraviolet light curable urethane acrylate resin, and which is formed onto the surface of glass. Since the surface of the coating layer has a slight adhesive property (which is referred to as "surface tackiness"), which causes adhesion of portions of the optical fiber to other portions thereof, a dispersion compensating optical fiber module produced by winding a long optical fiber into a small coil has problems in that temperature characteristics are increased.

The adhesive property (surface tackiness) is defined as the degree to which optical fibers stick together. A specific example of a method for measuring the adhesive property is disclosed in Japanese Patent Application, First Publication No. Hei 10-62301, in which the tensile change of an optical fiber which is wound many times around a delivery roll so as to be overlapped is measured by rewinding the optical fiber with a constant tension.

Specifically, various situations are anticipated for environments in which a dispersion compensating optical fiber module is employed, and suitable operations of the dispersion compensating optical fiber module may be required from the low temperature region (down to −40° C.) to the high temperature region (up to +80° C.). A dispersion compensating optical fiber used for the dispersion compensating optical fiber module has a short fiber length, a large absolute value of the wavelength dispersion, and a large effective area, which enable miniaturization of the module. Therefore, the microbending loss of the dispersion compensating optical fiber is larger than those of conventional dispersion compensating optical fibers. As a result, problems are caused in which the loss at the low temperature region is increased by the microbending loss and the surface tackiness, when the module is produced by using the dispersion compensating optical fiber. Although the aforementioned problems are caused depending on characteristics of the dispersion compensating optical fiber, the problems are significant when the module is formed into a small coil in which portions of the optical fibers are adhered to other portions thereof.

SUMMARY OF THE INVENTION

The present invention has been accomplished in view of the aforementioned circumstance, and aims at providing a dispersion compensating optical fiber module in which the loss change is suppressed over a broad temperature range even if the dispersion compensating optical fiber is wound around a small reel.

The present invention provides a dispersion compensating optical fiber comprising: an uncovered dispersion compensating optical fiber containing a core and a cladding; and a resin coating which is disposed around the uncovered dispersion compensating optical fiber and which has an adhesive property of 10 g/mm or less.

The resin coating may hves an adhesive property of 1 g/mm or less. The outer diameter of the uncovered dispersion compensating optical fiber may be in a range from 90 to 125 $\mu m$, and the outer diameter of the dispersion compensating optical fiber may be in a range from 180 to 250 $\mu m$.

The resin coating may include an outer coating layer. The outer coating layer may contain silicone in an amount of 1% by weight or more. The outer coating layer may include an ultraviolet light curable urethane acrylate resin containing a coloring agent. The outer coating layer may be formed to have a thickness of 3 $\mu m$ or more. The outer coating layer may be formed by a step different from an optical fiber drawing step.

The resin coating may further include a single or double coating layer formed between the cladding and the outer coating layer. The outer diameter of the uncovered dispersion compensating optical fiber may be in a range from 90 to 125 $\mu m$, and the diameter coated by the single or double coating layer may be in a range from 180 to 250 $\mu m$.

The optical fiber may have a bending loss of 20 dB/m or less at the bending diameter of 20 mm in an employed wavelength band selected from the range of 1.52 to 1.63 $\mu m$.

The dispersion compensating optical fiber may have an effective area of 19 $\mu m^2$ or more, a wavelength dispersion of −70 ps/nm/km or less, and a cut-off wavelength which is capable of substantially single mode propagation, in an employed wavelength band selected from the range of 1.52 to 1.63 µm, and the compensation ratio of the dispersion slope may be 80 to 120% when the wavelength dispersion of a single mode optical fiber having a zero dispersion wavelength shorter than the employed wavelength band is compensated for by using the dispersion compensating optical fiber having a length enough to compensate for the wavelength dispersion of the single mode optical fiber to zero or nearly zero.

The uncovered dispersion compensating optical fiber may have a refractive index profile including a center core portion; a core portion provided around the outer periphery of the center core portion and having a lower refractive index than that of the center core portion; a ring core portion provided around the outer periphery of the core portion and having a lower refractive index than that of the center core portion and a higher refractive index than that of the core portion; and a cladding portion provided around the periphery of the ring core portion and having a higher refractive index than the core portion and a lower refractive index than the ring core portion; in which the radius of the ring core portion is 6 to 10 µm; the ratio of the radius of the core portion relative to the radius of the center core portion is 2.5 to 4.0; and the ratio of the radius of the ring core portion relative to the radius of the core portion is 1.1 to 2.0; and when the refractive index of the cladding portion is taken as the standard, the relative refractive index of the center core portion is 1.2 to 1.7%; the relative refractive index of the core portion is −0.20 to −0.45%; and the relative refractive index of the ring core portion is 0.2 to 1.1%.

Moreover, the present invention provides a dispersion compensating optical fiber module, wherein the aforementioned dispersion compensating optical fiber is wound into a coil. The dispersion compensating optical fiber may be wound by the winding tension of 20 to 70 gf around a reel having a minimum diameter of 200 mm or less.

BRIEF DESCRIPTION OF THE DRAWINGS

FIG. 7 shows a relationship between the wavelength dispersion and the dispersion slope of a conventional dispersion compensating optical fiber.

DETAILED DESCRIPTION OF THE INVENTION

In the following, although preferred embodiments of the present invention will be explained, the present invention is not limited by the preferred embodiments, and components and concepts of the embodiments may be freely combined.

Figure 1:
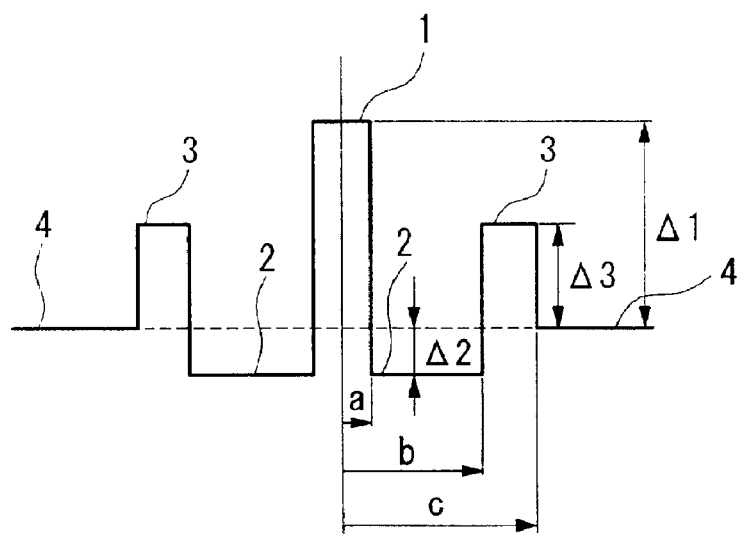
FIG. 1 shows a refractive index profile of a dispersion compensating optical fiber according to one embodiment of the present invention.

A dispersion compensating optical fiber according to a first embodiment of the present invention includes an uncovered dispersion compensating optical fiber and a resin coating. In FIG. 1, the refractive index profile of the uncovered dispersion compensating optical fiber is shown. As shown in FIG. 1, the uncovered dispersion compensating optical fiber includes a center core portion 1, a core portion 2 provided around the outer periphery of the center core portion 1, a ring core portion 3 provided around the outer periphery of the core portion, and a cladding portion 4 provided around the periphery of the ring core portion 3.

The center core portion 1 has a refractive index higher than that of the cladding portion 4. The core portion 2 has a refractive index lower than that of the cladding portion 4. The ring core portion 3 has a refractive index higher than that of the cladding portion 4.

As shown in FIG. 1, when the radius of the center core portion 1 is represented as a, the radius of the core portion 2 is represented as b, and the radius of the ring core portion 3 is represented as c, the dispersion compensating optical fiber is formed so that the ratio b/a is in the range from 2.5 to 4, the ratio c/b is in the range from 1.1 to 2.0, and the radius c is in the range from 6 to 10 µm.

When the relative refractive index differences for the central core portion 1 is represented as Δ1, the relative refractive index differences for the core portion 2 is represented as Δ2, and the relative refractive index differences for the ring core portion 3 is represented as Δ3, where the refractive index of the cladding portion 4 is taken as the standard, Δ1 is 1.2 to 1.7%, Δ2 is −0.20 to −0.45%, and Δ3 is 0.2 to 1.1%.

The dispersion compensating optical fiber has an effective area of 19 µm² or more, a wavelength dispersion of −70 ps/nm/km or less, and a cut-off wavelength which is capable of substantially single mode propagation, in an employed wavelength band selected from the range of 1.52 to 1.63 µm. The compensation ratio of the dispersion slope is 80 to 120% when the wavelength dispersion of a single mode optical fiber having a zero dispersion wavelength shorter than the employed wavelength band is compensated for by using the dispersion compensating optical fiber having a length sufficient to compensate for the wavelength dispersion of the single mode optical fiber to zero, or nearly zero.

The dispersion compensating optical fiber includes the uncovered dispersion compensating optical fiber having an outer diameter of 90 to 125 µm and the resin coating formed around the uncovered dispersion compensating optical fiber and having an adhesive property of 10 g/mm or less, preferably 1 g/mm or less. When the adhesive property of the dispersion compensating optical fiber is more than 10 g/mm, since portions of the dispersion compensating optical fiber tend to adhere to other portions thereof by winding the dispersion compensating optical fiber into a coil in accordance with the temperature change, the loss change tends to increase.

The adhesive property is measured by the following method. First, the optical fiber is wound on a winding roll a number of times, and is introduced into a transmitting side dancer roll. Then, it is introduced into a receiving roll through a first fixed roll, a moving roll and a second fixed roll, and is set to a tension pickup between the moving roll and the second fixed roll. The optical fiber passed through the receiving roll is mounted on a winding roll through a winding side dancer roll similar to the transmitting side dancer roll. Then, the winding roll is rotated to impart a fixed tension to the optical fiber. The tension pickup detects the moving quantity of a detecting roll by the tension of the optical fiber to detect the tension, and displays and records it on a monitor. In this case, since the tension change added to the optical fiber becomes a value according to the surface tackiness, the surface tackiness of the optical fiber can be easily and quantitatively measured and evaluated.

The resin coating includes a single or double coating layer and an outer coating layer disposed around the single or double coating layer. The diameter coated by the single or double coating layer is in a range from 180 to 250 $\mu$m. The outer coating layer has a thickness of 3 $\mu$m or more, and preferably 3 to 7 $\mu$m. The resin coating preferably contains at least one ultraviolet light curable resin such as ultraviolet light curable urethane acrylate resin. The outer coating layer may further contain silicone in an amount of 1% by weight or more, preferably 1 to 5% by weight, more preferably 2 to 3% by weight, relative to the total weight of the outer coating layer. By adding silicone into the outer coating layer in an amount of 1% by weight or more, the value of the adhesive property can be further reduced.

The dispersion compensating optical fiber can be produced by drawing an optical fiber preform (an uncovered dispersion compensating optical fiber) together with a resin composition containing silicone and the ultraviolet light curable resin. The optical fiber preform can be produced by a VAD method, an MCVD method, a PCVD method, or the like. The optical fiber drawing step for forming around the uncovered dispersion compensating optical fiber the resin coating having an adhesive property of 10 g/mm or less is preferably carried out under the conditions in which the resin composition is applied onto the uncovered dispersion compensating optical fiber to have a thickness of 3 $\mu$m or more, and in which the atmospheric oxygen concentration during curing of the ultraviolet light curable resins is set to 2% or less, more preferably 0%. Moreover, the drawing speed is preferably set to 300 to 1,000 m/min, more preferably 300 to 600 m/min, so as to prevent winding disarrangement.

Next, a dispersion compensating optical fiber according to a second embodiment of the present invention will be explained.

In the dispersion compensating optical fiber of this embodiment, the uncovered dispersion compensating optical fiber disclosed in the first embodiment is coated by a resin coating comprising an outer coating layer formed by an ultraviolet light curable urethane acrylate resin including silicone and a coloring agent. Preferably, the content of silicone in the ultraviolet light curable urethane acrylate resin is 1 to 5% by weight, and more preferably 2 to 3% by weight, relative to the total weight of the ultraviolet light curable urethane acrylate resin. The diameter coated by the resin coating is in a range from 180 to 250 $\mu$m. The adhesive property of the dispersion compensating optical fiber is 1 g/mm or less. The ultraviolet light curable resin containing a coloring agent may be a UV curable ink or the like. Instead of the coloring agent, other materials which can decrease the adhesive property of the resin coating can be mixed with the ultraviolet light curable resin.

The resin coating is formed by a step different from an optical fiber drawing step. The step of forming the resin coating is carried out under the conditions in which the atmospheric oxygen concentration during curing of the ultraviolet light curable urethane acrylate resin is set to 2% or less, more preferably 0%.

The dispersion compensating optical fiber has a bending loss of 20 dB/m or less at a bending diameter of 20 mm in an employed wavelength band selected from the range of 1.52 to 1.63 $\mu$m.

Next, one embodiment of a dispersion compensating optical fiber module according to the present invention will be explained.

The dispersion compensating optical fiber module is produced by winding the dispersion compensating optical fiber into a coil to suppress the loss change caused by the temperature change. The dispersion compensating optical fiber is wound by the winding tension of 20 to 70 gf, more preferably 30 to 50 gf, around a reel having a minimum diameter of 200 mm or less.

The aforementioned dispersion compensating optical fiber module is used by being disposed between a light source and a transmitting single mode optical fiber, or disposed to the side of the transmitting single mode optical fiber at which the optical signal is emitted.

Since the dispersion compensating optical fiber has a low adhesive property which can prevent portions of the wavelength dispersion compensating optical fiber from adhering to other portions thereof when the wavelength dispersion compensating optical fiber is wound into a small coil, the wavelength dispersion compensating optical fiber module has a low loss change in accordance with the temperature change over a broad temperature range. Therefore, the dispersion compensating optical fiber module can have a low loss and can be miniaturized.

EXAMPLES

In the following, specific examples will be explained.

Example 1

Five dispersion compensating optical fiber preforms were produced by an MCVD method or a PCVD method. Then, dispersion compensating optical fibers (A to E) were produced by drawing the dispersion compensating optical fiber preforms together with an ultraviolet light curable resin. The drawing step of each of the dispersion compensating optical fiber preforms was carried out while controlling drawing conditions so that the produced resin coating had an adhesive property of 5 to 6 g/mm. Specifically, the atmospheric oxygen concentration during curing of the ultraviolet light curable resin was set to 2% or less, and the drawing speed was set to be 300 m/min so as to prevent winding irregularities.

Each of the dispersion compensating optical fibers (A to E) has a profile as shown in FIG. 1. The specific refractive index difference $\Delta 1$ of the center core portion 1, the specific refractive index difference $\Delta 2$ of the core portion 2, the specific refractive index difference $\Delta 3$ of the ring core portion 3, the ratio b/a of the core radius relative to the center core radius, the ratio c/b of the ring core radius relative to the core radius, and other optical properties, of each of the uncovered dispersion compensating optical fibers (A to E) are shown in Table 1. As shown in Table 1, each of the dispersion compensating optical fibers has a low transmission loss in a range from 0.25 to 0.32 dB/km and has a large effective area $A_{eff}$ of 20 $\mu$m$^2$ or more.

TABLE 1

| No. | Δ1 (%) | Δ2 (%) | Δ3 (%) | b/a | c/b | core radius (μm) | wavelength (μm) | $A_{eff}$ (μm$^2$) | transmission loss (dB/km) | wavelength dispersion (ps/nm/km) | dispersion slope (ps/nm$^2$/km) | bending loss (dB/m) 2R = 20 mm |
|---|---|---|---|---|---|---|---|---|---|---|---|---|
| A | 1.65 | −0.31 | 0.50 | 3.3 | 1.23 | 7.5 | 1.55 | 21.7 | 0.31 | −84.2 | −0.27 | 2.2 |
| B | 1.70 | −0.32 | 0.50 | 3.4 | 1.23 | 7.5 | 1.55 | 20.7 | 0.32 | −90.0 | −0.28 | 1.3 |
| C | 1.36 | −0.26 | 0.22 | 3.4 | 1.77 | 8.9 | 1.55 | 21.4 | 0.29 | −82.0 | −0.24 | 7.5 |
| D | 1.30 | −0.44 | 0.96 | 3.2 | 1.20 | 6.2 | 1.55 | 20.5 | 0.28 | −80.2 | −0.24 | 3.9 |
| E | 1.30 | −0.34 | 1.02 | 3.6 | 1.20 | 6.7 | 1.55 | 21.6 | 0.30 | −80.0 | −0.24 | 4.1 |

By using the dispersion compensating optical fibers A and B shown in Table 1, three dispersion compensating optical fiber modules (A to C) each of which has a dispersion compensation value different from the others were produced. Characteristics of the dispersion compensating optical fiber modules are shown in Table 2. As shown in Table 2, results of the characteristics required for the dispersion compensating optical fiber modules, such as dispersion slope compensation ratio, insertion loss, PMD, and the like are satisfactory.

TABLE 2

| No. | insertion loss (dB) | dispersion value (ps/nm) | dispersion slope (ps/nm$^2$) | dispersion slope compensation ratio (%) | $A_{eff}$ (μm$^2$) | PMD at wavelength band of 1550 nm (ps) |
|---|---|---|---|---|---|---|
| module A | 2.08 | −340 | −1.09 | 92 | 21.7 | 0.2 |
| module B | 3.36 | −680 | −2.18 | 92 | 21.7 | 0.3 |
| module C | 5.63 | −1360 | −4.23 | 89 | 20.7 | 0.4 |

(wavelength: 1550 nm)

It is possible to increase transmission capacity and to increase transmission length by inserting the dispersion compensating optical fiber module and an amplifier module into the terminal of a transmission line of a conventional single mode optical fiber. Moreover, it is possible to miniaturize the module by using the dispersion compensating optical fiber having a low bending loss and a large absolute value of the wavelength dispersion.

Figure 2:
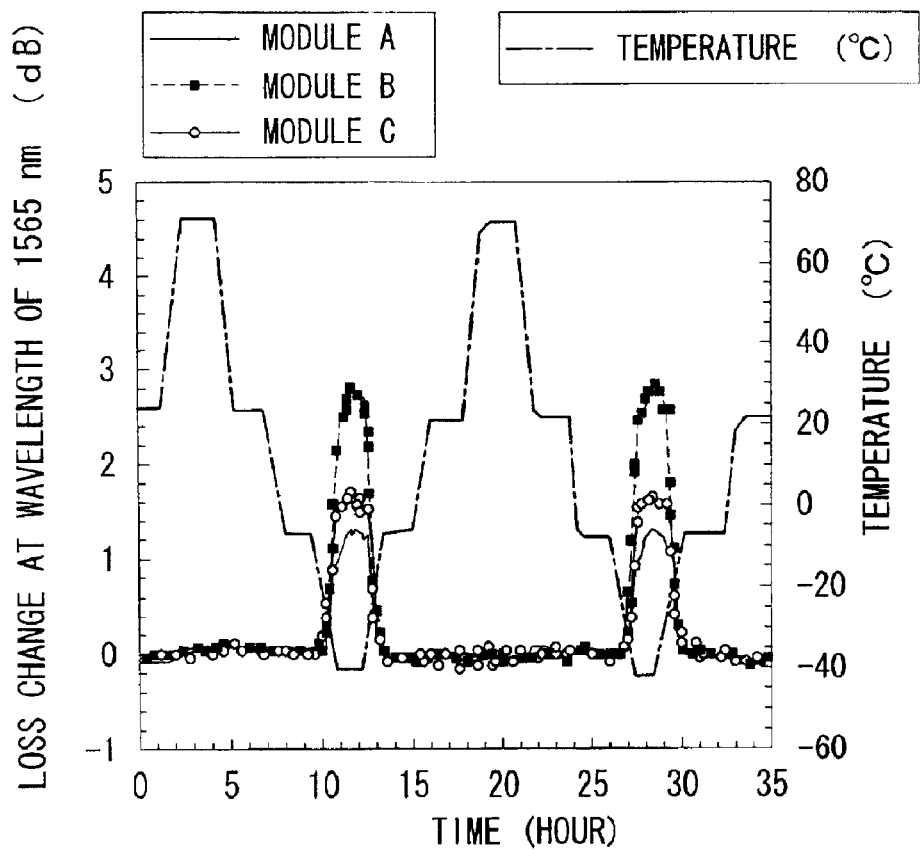
FIG. 2 shows relationships between the loss change and the temperature change of dispersion compensating optical fiber modules in examples according the present invention.

Moreover, temperature characteristics of the insertion loss of the dispersion compensating optical fiber modules are shown in FIG. 2. As shown in FIG. 2, although the loss increase is approximately 2 dB at the low temperature region near −40° C., the loss increase is not recognized at other regions except the low temperature region near −40° C. Therefore, the dispersion compensating optical fiber modules can be satisfactorily used under normal conditions, because the dispersion compensating optical fiber modules are rarely used in continuous operations at −40° C.

Example 2

Five dispersion compensating optical fiber preforms were produced by an MCVD method or a PCVD method. Then, dispersion compensating optical fibers each of which had the same profile as shown in FIG. 1 were produced by drawing the dispersion compensating optical fiber preforms with an ultraviolet light curable resin to form a double coating layer, and then by coating a resin composition including silicone and an ultraviolet light curable urethane acrylate resin containing a coloring agent to form an outer coating layer around the double coating layer, while controlling coating conditions so that the produced resin had an adhesive property of 1 g/mm or less. Specifically, the resin composition was used to form the outer coating layer having a thickness of 3 μm or more and the atmospheric oxygen concentration during curing the resin composition was set to 2% or less.

Each of the produced dispersion compensating optical fibers includes an uncovered dispersion compensating optical fiber having an outer diameter of 125 μm, the double coating layer by which the coated diameter was 230 μm, and the outer coating layer by which the coated diameter was 240 μm. That is, the thickness of the outer diameter was 5 μm.

Each of the produced dispersion compensating optical fibers has a low transmission loss in a range from 0.25 to 0.32 dB/km and has a large effective area ($A_{eff}$) of 20 μm$^2$ or more.

By using the dispersion compensating optical fibers each having the same profile as that of the aforementioned dispersion compensating optical fiber A or B, three dispersion compensating optical fiber modules (D to F), each of which has a dispersion compensation value different from the others, were produced. Characteristics of the dispersion compensating optical fiber modules are shown in Table 3. As shown in Table 3, results of the characteristics required for the dispersion compensating optical fiber modules, such as dispersion slope compensation ratio, insertion loss, PMD, and the like are satisfactory.

TABLE 3

| No. | insertion loss (dB) | dispersion value (ps/nm) | dispersion slope (ps/nm²) | dispersion slope compensation ratio (%) | $A_{eff}$ ($\mu m^2$) | PMD at wavelength band of 1550 nm (ps) |
|---|---|---|---|---|---|---|
| module D | 2.08 | −340 | −1.09 | 92 | 21.7 | 0.2 |
| module E | 3.36 | −680 | −2.18 | 92 | 21.7 | 0.3 |
| module F | 5.63 | −1360 | −4.23 | 89 | 20.7 | 0.4 |

(wavelength: 1550 nm)

Figure 3:
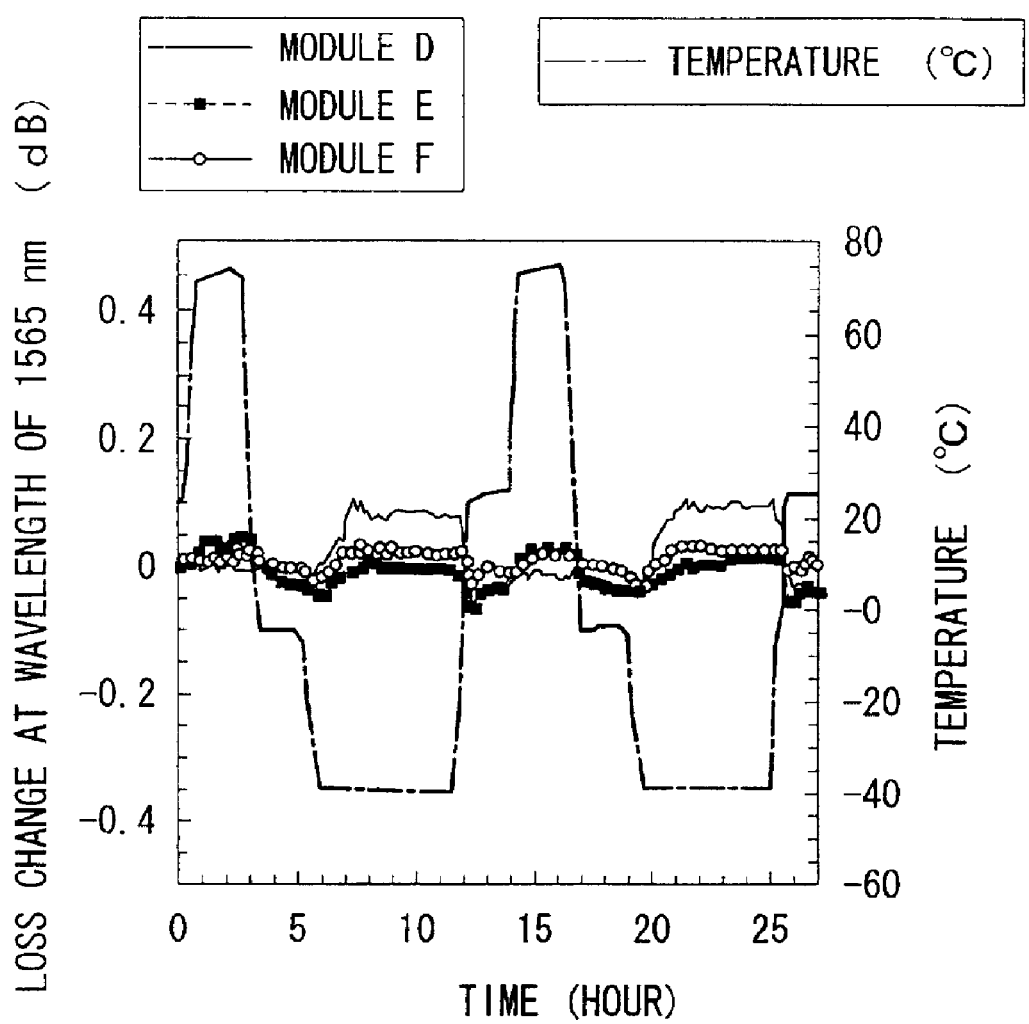
FIG. 3 shows relationships between the loss change and the temperature change of dispersion compensating optical fiber modules in examples according to the present invention.

Moreover, temperature characteristics of the insertion loss of the dispersion compensating optical fiber modules are shown in FIG. 3. As shown in FIG. 3, the maximum value of the loss change was 0.1 dB or less in the temperature range of −40 to +75° C., and the temperature characteristics were improved. It is supposed that the temperature characteristics were improved in the low temperature range because the dispersion compensating optical fiber modules were produced from the dispersion compensating optical fiber of which the resin coating had an adhesive property of 1 g/mm or less.

Example 3

Two dispersion compensating optical fiber preforms were produced by an MCVD method or a PCVD method. Then, dispersion compensating optical fibers (F and G) were produced by drawing the dispersion compensating optical fiber preforms with ultraviolet light curable resin to form a double coating layer, and then by coating a resin composition including silicone and an ultraviolet light curable urethane acrylate resin containing a coloring agent to form an outer coating layer around the double coating layer, while controlling coating conditions so that the produced resin had an adhesive property of 1 g/mm or less.

Each of the dispersion compensating optical fibers (F and G) has a profile as shown in FIG. 1 and properties shown in Table 4. Each of the produced dispersion compensating optical fibers includes an uncovered dispersion compensating optical fiber having an outer diameter of 125 $\mu$m, the double coating layer by which coated diameter was 230 $\mu$m, and the outer coating layer by which coated diameter was 240 $\mu$m. That is, the outer coating layer had a thickness of 5 $\mu$m.

Each of the produced dispersion compensating optical fibers can compensate, in an employed wavelength band selected from a range of 1565 nm to 1625 nm, a single mode optical fiber having a wavelength dispersion of +19.0 ps/nm/km and a wavelength dispersion slope of +0.054 ps/nm²/km, at a wavelength of 1590 nm.

Each of the produced dispersion compensating optical fibers has a low transmission loss in a range from 0.25 to 0.32 dB/km and has a large effective area ($A_{eff}$) of 20 $\mu m^2$ or more.

TABLE 4

| No. | Δ1 (%) | Δ2 (%) | Δ3 (%) | b/a | c/b | core radius ($\mu$m) | $A_{eff}$ ($\mu m^2$) | transmission loss (dB/km) | wavelength dispersion (ps/nm/km) | dispersion slope (ps/nm²/km) | bending loss (dB/m) 2R = 20 mm |
|---|---|---|---|---|---|---|---|---|---|---|---|
| F | 1.65 | −0.31 | 0.50 | 3.3 | 1.23 | 8.6 | 24.7 | 0.30 | −84.2 | −0.21 | 2.2 |
| G | 1.70 | −0.32 | 0.50 | 3.4 | 1.23 | 9.4 | 23.7 | 0.32 | −90.0 | −0.28 | 1.3 |

(wavelength: 1590 nm)

By using the dispersion compensating optical fibers F and G shown in Table 4, three dispersion compensating optical fiber modules (G to I) each of which has a dispersion compensation value different from the others were produced. Characteristics of the dispersion compensating optical fiber modules are shown in Table 5. As shown in Table 5, results of the characteristics required for the dispersion compensating optical fiber modules, such as dispersion slope compensation ratio, insertion loss, PMD, and the like are satisfactory.

TABLE 5

| No. | insertion loss (dB) | dispersion value (ps/nm) | dispersion slope (ps/nm²) | dispersion slope compensation ratio (%) | $A_{eff}$ ($\mu m^2$) | PMD at wavelength band of 1590 nm (ps) |
|---|---|---|---|---|---|---|
| module G | 2.15 | −380 | −0.95 | 89 | 24.7 | 0.2 |
| module H | 3.51 | −760 | −1.90 | 89 | 24.7 | 0.3 |
| module I | 6.04 | −1520 | −4.05 | 95 | 23.7 | 0.4 |

(wavelength: 1590 nm)

Figure 4:
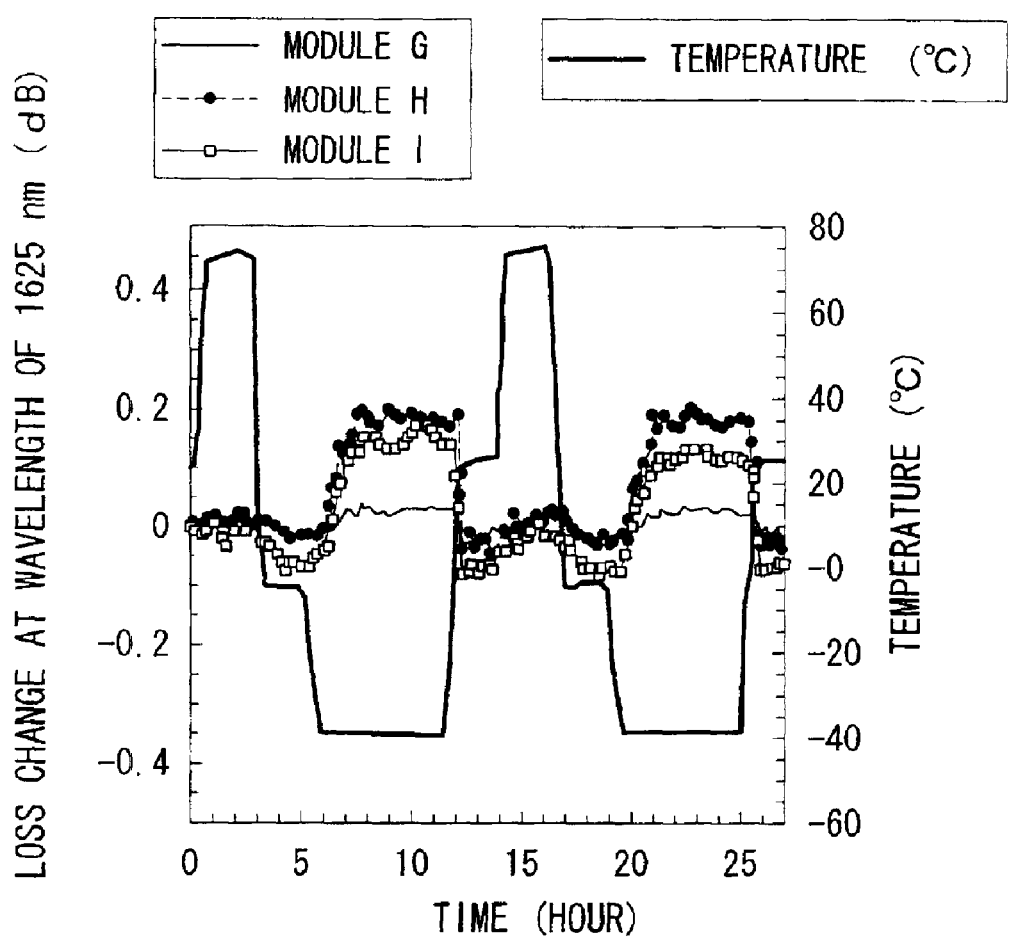
FIG. 4 shows relationships between the loss change and the temperature change of dispersion compensating optical fiber modules in examples according to the present invention.

Moreover, temperature characteristics of the insertion loss of the dispersion compensating optical fiber modules were measured at a wavelength of 1625 nm which is the longest wavelength in the employed wavelength band. Obtained results are shown in FIG. 4. As shown in FIG. 4, the maximum value of the loss change was 0.2 dB or less in the temperature range of −40 to +75° C., and the temperature characteristics were improved.

Next, comparative examples will be shown so as to compare them with the aforementioned examples.

Comparative Example 1

Five dispersion compensating optical fiber preforms were produced by an MCVD method or a PCVD method. Then, dispersion compensating optical fibers were produced by drawing the dispersion compensating optical fiber preforms. The drawing step of each of the dispersion compensating optical fiber preforms was carried out by using ultraviolet light curable resin under the conditions in which the atmospheric oxygen concentration during curing the ultraviolet light resin was not controlled.

Each of the dispersion compensating optical fibers has the same profile as shown in FIG. 1 and properties shown in Table 1. The adhesive property of each of the produced dispersion compensating optical fibers was 15 g/mm.

By using the dispersion compensating optical fibers each having the same profile as that of the dispersion compensating optical fibers A or B, five dispersion compensating optical fiber modules (J to N) each of which has a dispersion compensation value different from the others were produced.

Characteristics of the dispersion compensating optical fiber modules were shown in Table 6. As shown in Table 6, results of the characteristics required for the dispersion compensating optical fiber modules, such as dispersion slope compensation ratio, insertion loss, PMD, and the like are satisfactory.

Figure 5:
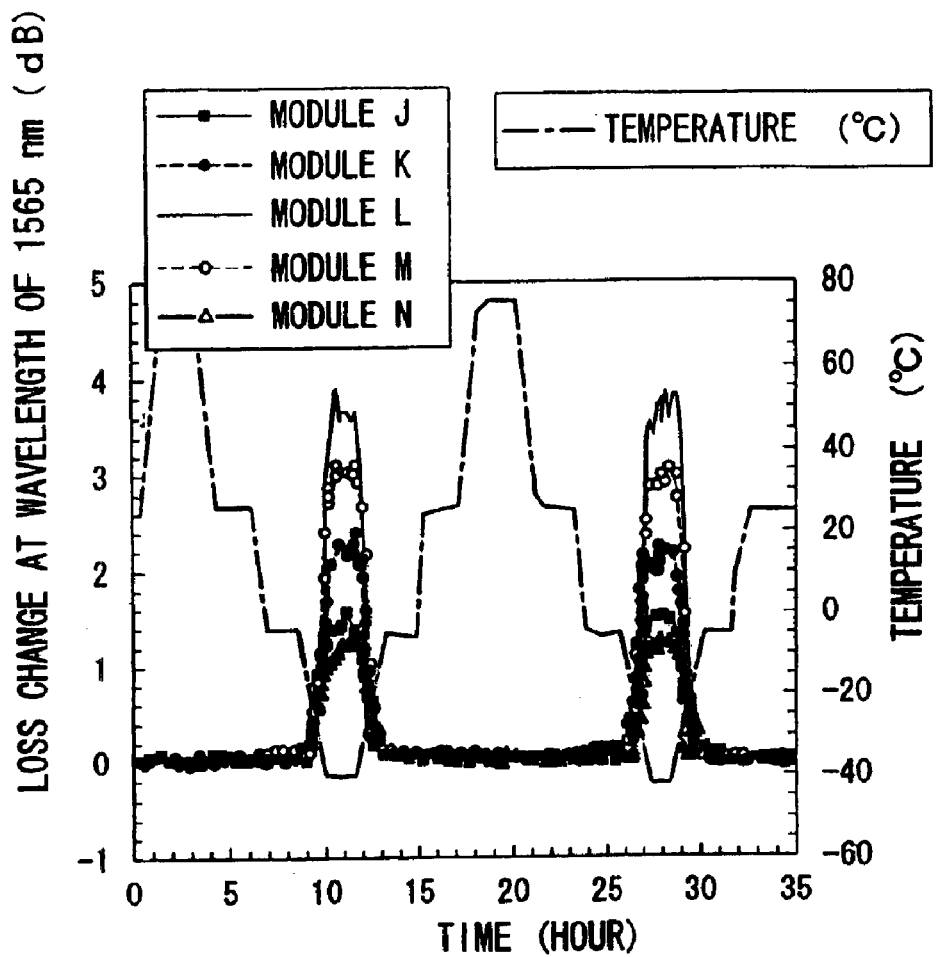
FIG. 5 shows relationships between the loss change and the temperature change of dispersion compensating optical fiber modules in comparative examples.
Figure 6:
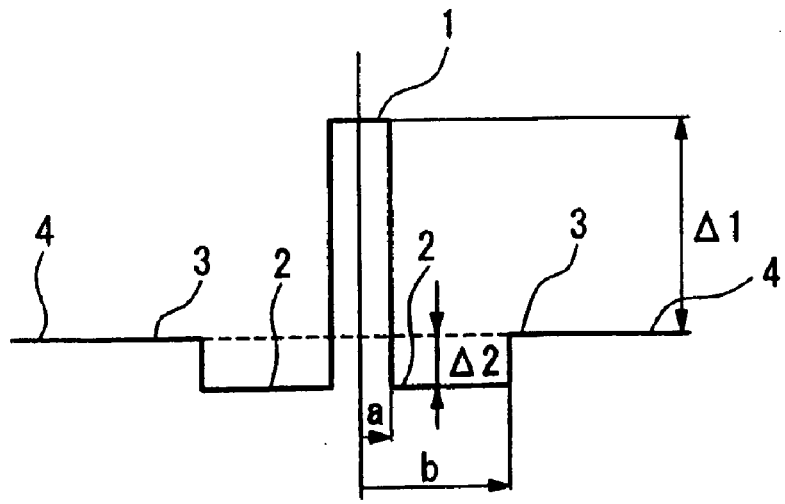
FIG. 6 shows a refractive index profile of a conventional dispersion compensating optical fiber.

Temperature characteristics of the insertion loss of the dispersion compensating optical fiber modules are shown in FIG. 5. As shown in FIG. 5, the loss increase is approximately 2 dB at the low temperature region near −40° C., and a large loss increase more than 3 dB is seen at the low temperature region of −40° C. That is because the dispersion compensating optical fiber modules were produced from the dispersion compensating optical fibers each of which has an adhesive property of 15 g/mm, which is larger than those of the dispersion compensating optical fibers in Examples.

As described above, since the dispersion compensating optical fiber according to the present invention has a low adhesive property, the dispersion compensating optical fiber module produced from the dispersion compensating optical fiber can satisfactorily compensate for the wavelength dispersion and the dispersion slope while suppressing the loss increase in accordance with the broad temperature change, which is caused by adhering portions of the dispersion compensating optical fiber to other portions thereof when winding the dispersion compensating optical fiber into a coil to form the dispersion compensating optical fiber module. Thus, according to the present invention, it is possible to prevent the loss increase of the dispersion compensating optical fiber module and to miniaturize the dispersion compensating optical fiber module.

What is claimed is:

1. A dispersion compensating optical fiber comprising:
   an uncovered dispersion compensating optical fiber containing a core and a cladding;
   a resin coating which is disposed around the uncovered dispersion compensating optical fiber and which has an adhesive property of 10 g/mm or less, the adhesive property being defined by variation range of tension in an optical fiber when the optical fiber is unwound from a wound state; and
   an outer coating layer having a thickness of 3 to 7 $\mu$m, containing silicone in an amount of 1 to 5% by weight, and disposed around the resin coating,

TABLE 6

| No. | insertion loss (dB) | dispersion value (ps/nm) | dispersion slope (ps/nm²) | dispersion slope compensation ratio (%) | $A_{eff}$ ($\mu m^2$) | PMD at wavelength band of 1550 nm (ps) |
|---|---|---|---|---|---|---|
| module J | 2.08 | −340 | −1.09 | 92 | 21.7 | 0.2 |
| module K | 3.36 | −680 | −2.18 | 92 | 21.7 | 0.3 |
| module L | 3.22 | −680 | −2.12 | 89 | 20.7 | 0.4 |
| module M | 5.91 | −1360 | −4.36 | 92 | 21.7 | 0.3 |
| module N | 5.63 | −1360 | −4.23 | 89 | 20.7 | 0.4 |

(wavelength: 1550 nm)

wherein an outer diameter of the uncovered dispersion compensating optical fiber is in a range from 90 to 125 μm, and an outer diameter of the dispersion compensating optical fiber is in a range from 180 to 250 μm, wherein the dispersion compensating optical fiber has an effective area of 19 μm² or more, a wavelength dispersion of −70 ps/nm/km or less, and a cut-off wavelength which is capable of substantially single mode propagation, in an employed wavelength band selected from the range of 1.52 to 1.63 μm, and the compensation ratio of the dispersion slope is 80 to 120% when the wavelength dispersion of a single mode optical fiber having a zero dispersion wavelength shorter than the employed wavelength band is compensated for by using the dispersion compensating optical fiber having a length enough to compensate for the wavelength dispersion of the single mode optical fiber to zero or nearly zero, and wherein the uncovered dispersion compensating optical fiber has a refractive index profile including a center core portion; a core portion provided around the outer periphery of the center core portion and having a lower refractive index than that of the center core portion; a ring core portion provided around the outer periphery of the core portion and having a lower refractive index than that of the center core portion and a higher

* * * * *